Nov. 14, 1939.     O. WITTEL     2,180,027
LENS MOUNT ADAPTER
Filed July 21, 1937

Otto Wittel
INVENTOR.

BY Newton M. Perrins
George A. Gillette Jr.
ATTORNEYS

UNITED STATES PATENT OFFICE 2,180,027

LENS MOUNT ADAPTER

Otto Wittel, Rochester, N. Y., assignor to Eastman Kodak Company, Rochester, N. Y., a corporation of New Jersey Application July 21, 1937, Serial No. 154,838

2 Claims. (Cl. 88—57)

This invention relates to a lens mount adapter for attaching a lens mount to a camera, and particularly to a lens mount adapter which will permit the lens mount as a whole to be rotated relative to the camera after it has been positioned thereon for correctly positioning the indexes thereon relative to the camera, or withhold the lens mount as a whole against movement relative to the camera.

In a lens mount for the purpose in question, it is common to adjust the lens or diaphragm by rotating one part of the mount relative to another part of the mount. The relatively movable parts of the mount are usually provided with index marks or figures to indicate the stop diameter or focal distance, as the case may be. When a mount of this type is secured to the camera body through threaded engagement, it may happen that the mount, when screwed into place, will come to a position in which the index marks are not in a position where they may be seen conveniently.

The principal object of the present invention is the provision of a lens mount adapter which overcomes the above objections, and permits an adjustment of the lens mount as a whole after being positioned on a camera so that the index marks thereon can be brought into a position where they can be seen conveniently. Another object is the provision of a lens mount adapter of the type described which includes an adjusting means for optionally permitting an adjustment of the lens mount as a whole relative to the camera, or a clamping of the same against such an adjustment. And still another object is the provision of a lens mount adapter which can be easily applied to any lens mount which is adapted to be attached to a camera through a screw-threaded engagement without necessitating any major alterations in the lens mount. And yet another object is the provision of a lens mount adapter of the type described which, when applied to a lens mount, does not detract from the appearance of the mount, but appears to be a part of the mount itself. And still a further object is the provision of a lens mount adapter which is simple and convenient to adjust, effective in operation, and cheap to manufacture.

Figure 1:
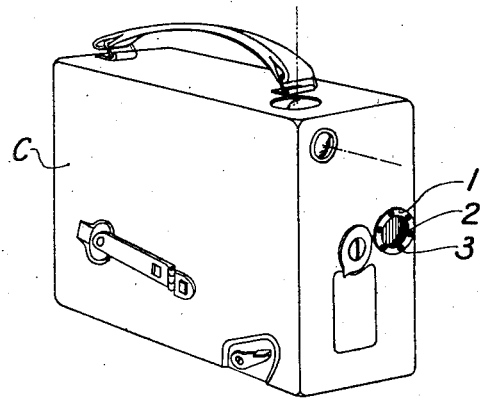
Figure 2:
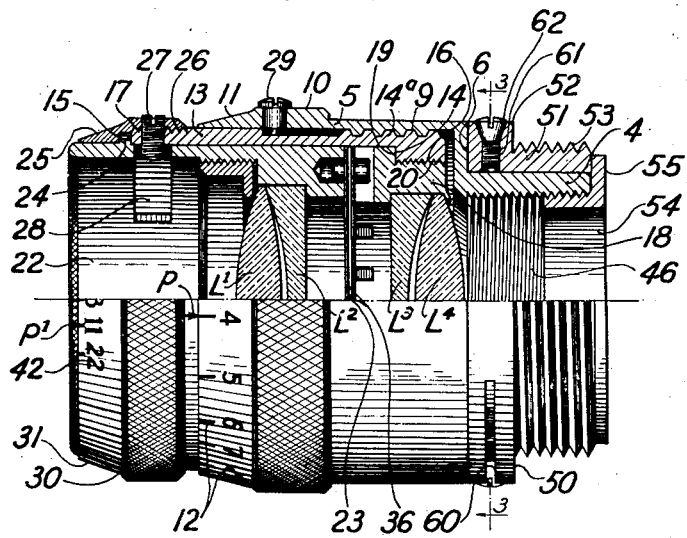
Figure 3:
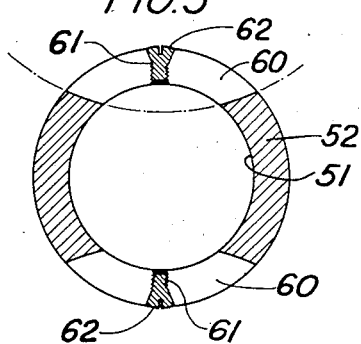

The novel features which I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which:

Fig. 1 shows a typical small motion picture camera equipped to receive a lens mount including an adapter constructed in accordance with my invention, Fig. 2 is a half section and a half elevation of a well-known lens mount equipped with an adapter constructed in accordance with the present invention, and Fig. 3 is a partial section taken on line 3—3 of Fig. 2.

Like reference characters refer to corresponding parts throughout the drawing.

In order to clearly illustrate the application and purpose of my novel lens mount adapter, I have chosen to show it incorporated on a lens mount of the type shown and described in U. S. Patent No. 1,676,595, which issued to me on July 10, 1928. It is pointed out that the adapter has been shown in connection with this particular lens mount merely because it serves to illustrate the application of the adapter as well as showing how it can be incorporated on a well-known mount without necessitating any major alterations in the mount itself. It is to be understood that the adapter can be used and can be applied to any lens mount which is attached to a camera through a threaded engagement and which includes one or more relatively adjustable parts for effecting a change of focus or the like.

Since the specific construction and operation of the lens mount per se forms no part of the present invention, only a general description of the construction and operation of the same, sufficient to show the application of the adapter, will be included in this specification. A detailed description of the lens mount per se can be had by referring to my above-noted application covering the same.

As shown in Fig. 1, the camera C is provided with a ring 1 threaded at 2 to receive the lens mount. This ring may be attached or fixed to the camera in any desired manner such as by screws 3.

The embodiment of the lens mount shown preferably consists of a tubular body member 5 having a reduced rear end 4 connected to the forward end of the body member through the radially extended shoulder 6. This tubular body member 5 includes an internal thread 9, a knurled band 10, by which it may be turned relative to the camera, as will be hereinafter described, and a beveled portion 11. This bevel is adapted to receive a focusing scale 12.

A second tube 13 forms the lens barrel. This tube is threaded at 14A to engage thread 9, so that the tube may be moved axially of the body member 5. It is also provided with a pair of shoulders 14 and 15, and is threaded at 16 and 17. A set-screw 29 limits the movement of the tube 13 relative to the mount.

The lens mount is shown as consisting of two components, of several lenses designated L—1, L—2, L—3 and L—4. One component comprising L—3 and L—4, is mounted in a lens mount 18 having a shoulder 19 located by shoulder 14 and threads 20 engaging threads 16. This cell is fixed on the tube 13. Tube 13 preferably carries a pointer P to indicate the focus on scale 12.

The other lens component, comprising L—1 and L—2, is mounted in a third tubular telescoping member 22, which constitutes a cell for the front component and at the same time an operating ring for the diaphragm designated broadly as 23, and described in detail in the above-noted Patent No. 1,676,595 in my name. The cell 22 preferably carries a flange 24 which lies against the shoulder 15, and is held against this shoulder by a collar 25 having a threaded portion 26 engaging the thread 17. A pin or screw 27 holds the collar in a set position, and said screw is extended into the slot 28 in cell 22 to limit the turning movement of this member. Collar 25 is provided with a knurled or roughened operating portion 30 by which the lens barrel may be turned, and a beveled face 31 on which a diaphragm scale may be engraved. Thus, by bringing the pointer P' to the desired point on the scale 42, the diaphragm may be set. It should be noted that the shoulders 14 and 15 hold the lens cells at a predetermined fixed spacing.

The diaphragm 23 is made up of a plurality of leaves 36, which are interconnected with the stationary lens cell 18 and the movable lens cell 22, so that the opening and closing of the diaphragm can be effected by rotating the tubular telescoping member 22. A detailed description and showing of this particular diaphragm can be had by referring to my above-noted Patent No. 1,676,595 but, since the operation of the diaphragm has no particular connection with the present invention, a detailed description of the diaphragm structure is not deemed necessary herein.

The lens mount structure described up to this point is substantially the same as that shown in my Patent 1,676,595, and forms no part of the present invention. It will be readily understood by those skilled in the art that, when a lens mount of the type shown is attached to a camera by having the rear end 4 of the tubular body member 5 in screw-threaded engagement with the camera, as in common practice, there is no insurance that the focusing scale and the body member 5 will be on the top side of the mount where it can be conveniently viewed with the camera in picture-taking position. To overcome this contingency is the purpose of my novel lens mount hereinafter described, said adapted constituting the present invention.

On the reduced end 4 of the body tube 5 is rotatably mounted my novel adapter designated broadly at 50, see Fig. 2. This adapter comprises a ring, hereinafter referred to as a mounting ring 51, having a radial flange 52 at one end which is adapted to be flush with the periphery of the body tube 5, and a threaded portion 53, which is adapted to be screwed into the ring 1 on the camera C for attaching the lens mount onto said camera. The retaining ring 54 is screw-threaded into the internally threaded rear end 46 of the body tube 5, and a radially extending flange 55 thereon extends beyond the periphery of the rear end of the body tube 5 to engage the threaded end of the mounting ring 51 to keep the ring from sliding axially off the rear end of the body tube. When the retaining ring 54 is tightened down, the mounting ring 51 is adapted to be held between the flange 55 thereon and the shoulder 6 on the body tube 5 in such a way that the ring is permitted to rotate relative to the body tube 5, but is prevented from axial movement relative to said body tube. The lens mount is attached to the camera by screwing the mounting ring 51 into the ring 1 on the camera C.

After the mounting ring 51 has been screwed into the ring 1 on the camera, the body tube 5 is rotated relative to the mounting ring until the focusing scale 12 thereon is on the top side of the mount where it can be conveniently viewed, after which the body tube 5 is clamped against movement relative to the mounting ring in the manner hereinafter described. One or more peripheral slots 60, in the case shown two spaced 180 degrees apart, are cut through the flange 52 of the mounting ring 51, see Fig. 3, to allow the mounting ring 51 to be spread longitudinally. A hole 61, extending radially through the flange 52 and located in the center of each of the peripheral slots 60, is tapped to receive a conical headed adjusting screw 62, see Figs. 2 and 3. When the adjusting screws 62 are unscrewed so that the conical heads thereof do not contact the edges of the slots 60, the mounting ring permits relative rotation between the body tube 5 and itself. On the other hand, after the body tube has been rotated to properly locate the scale 12 thereon, a tightening of the adjusting screws causes the conical heads thereof to spread the mounting ring longitudinally so that it is rigidly clamped between the shoulder 6 of the body tube 5 and the flange 55 of the retaining ring. In order to prevent the heads of the adjusting screws 62 from extending too far from the periphery of the mounting ring when they are in the releasing position, the holes 61 receiving the same can be countersunk.

Referring to Fig. 2, it will be appreciated that the retaining ring 54 is provided to permit easy assembling of the mounting ring 51 onto the body tube 5, and since it is rigidly connected to the body tube 5 after assembly of the mount, it can be assumed to be an integral part thereof. If ease in assembling the mounting ring 51 onto the body tube 5 were no criterion, the rear end of the body tube could be formed so as to have a groove in the rear end thereof such as is formed in the drawing by shoulder 6 on the body tube 5 and the flange 55 of the retaining ring 54.

The frictional engagement set up between the shoulder 6, the flange 55, and the mounting ring 51 is sufficient to clamp the body tube 5 relative to the camera after which the tube 13, forming the lens barrel, can be rotated relative to the body tube for focusing the lens mount. This mounting ring, or adapter 51, when applied to a lens mount functions and appears as an integral part of the mount; and, although it has been illustrated in connection with a lens mount of the type described in my Patent No. 1,676,595 of July 10, 1928, it will be understood by one skilled in the art that it can be adapted to any other lens mount of the focusing type which is adapted to have one part screwed into a camera while another part thereof is adapted to be adjusted relative thereto.

Although I have shown and described one specific embodiment of my invention, I am fully aware that many modifications thereof are possible. My invention, therefore, is not to be restricted except insofar as is necessitated by the prior art and by the spirit of the appended claims.

What I claim is:

1. In a lens mount the combination with a tubular body member having a radially-extending shoulder adjacent the rear end thereof, a lens-carrying member supported by the body member and adjustable therein for focusing, of a screw-threaded mounting ring rotatably mounted on the rear end of the body member with one end thereof abutting the radially-extending shoulder on the body member, said mounting ring adapted for attaching the lens mount to a camera and having one or more peripheral slots extending therethrough, a retaining ring in screw-threaded engagement with the rear end of the body member, and having a flange on the end thereof engaging the other end of the mounting ring whereby said ring is permitted rotation relative to the body member but is prevented from axial movement relative thereto, and conical headed adjusting screws extending radially into the peripheral slots of said mounting ring and being in threaded engagement therewith, the heads of said screws adapted, when turned down, to spread the mounting ring longitudinally for setting up a frictional engagement between the mounting ring, the body member and the retaining ring to prevent relative rotation of these parts.

2. In a lens mount the combination with a tubular body member having a pair of radially extending shoulders adjacent one end thereof, a lens-carrying member supported by a body member and adjustable therein for focusing, of a screw threaded mounting ring rotatably mounted on said body member with each of the opposite ends thereof abutting one of said shoulders, whereby said ring is permitted free rotation relative to said body member but is prevented from axial movement relative thereto, said ring adapted for attaching said mount to a camera and provided with a peripheral slot extending therethrough, and a conical headed screw extending radially into and being in threaded engagement with said peripheral slot, the head of said screw adapted, when turned down, to spread the mounting ring longitudinally for setting up a frictional engagement between the ends of the mounting ring and said shoulders on the body member to prevent relative rotation of these parts.

OTTO WITTEL